US006639913B1

(12) United States Patent
Frankel et al.

(10) Patent No.: US 6,639,913 B1
(45) Date of Patent: *Oct. 28, 2003

(54) SYSTEM AND METHOD FOR COMMUNICATING VOICE AND DATA OVER A LOCAL PACKET NETWORK

(75) Inventors: David P. Frankel, Sunnyvale, CA (US); Joe Boucher, Sunnyvale, CA (US); Kenneth M. Kolderup, Saratoga, CA (US)

(73) Assignee: Paradyne Corporation, Largo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/314,318

(22) Filed: May 19, 1999

Related U.S. Application Data

(63) Continuation-in-part of application No. 09/112,911, filed on Jul. 9, 1998, now Pat. No. 6,075,784.
(60) Provisional application No. 60/088,399, filed on Jun. 8, 1998.

(51) Int. Cl.[7] .............................................. H04L 12/66
(52) U.S. Cl. ........................................ 370/356; 370/352
(58) Field of Search ................................ 370/352, 353, 370/354, 355, 356, 466, 467, 357, 386–388; 455/3.1–3.3, 4.1–4.2, 5.1–6.2; 379/88.17

(56) References Cited

U.S. PATENT DOCUMENTS

| | | | |
|---|---|---|---|
| 4,100,377 A | | 7/1978 | Flanagan |
| 4,740,955 A | * | 4/1988 | Litterer et al. ............... 370/264 |
| 5,386,417 A | * | 1/1995 | Daugherty et al. .......... 340/2.1 |
| 5,392,280 A | | 2/1995 | Zheng |
| 5,526,353 A | | 6/1996 | Henley et al. |
| 5,534,912 A | * | 7/1996 | Kostreski ..................... 725/100 |
| 5,604,737 A | | 2/1997 | Iwami et al. |
| 5,613,190 A | | 3/1997 | Hylton |
| 5,742,596 A | * | 4/1998 | Baratz et al. ............... 370/356 |
| 6,075,784 A | | 6/2000 | Frankel et al. |

OTHER PUBLICATIONS

"Pots Splitter" Alcatel Network Systems, Inc. and *Compagnie Financiere Alcatel*, 1998, (1 page).
"Alcatel 1000 ADSL System Overview" Alcatel Network Systems, Inc. and *Compagnie Financiere Alcatel*, 1998, (2 pages).

(List continued on next page.)

*Primary Examiner*—Dang Ton
*Assistant Examiner*—Phuc Tran
(74) *Attorney, Agent, or Firm*—Thomas, Kayden, Horstemeyer & Risley, L.L.P.

(57) ABSTRACT

A system and method of communicating voice and data via a local packet network (LPN) to and from a customer site. A remote digital terminal (RDT) is provided at a customer site to interface a plurality of telephone devices and/or data devices (computers or a local area network of computers) with the LPN via a local loop link, such as a Digital Subscriber Line or a wireless local loop. A host digital terminal (HDT) is provided at a control site within or connected to the LPN that coordinates the communication of voice calls between the RDT and a public switched telephone network (PSTN) switch via the LPN and that coordinates the communication of data between the RDT and a data network within or without the LPN. Multiple telephone calls with the customer site can be supported by the remote digital terminal over a single local loop link connected to the LPN. A wire center remote digital terminal (WC-RDT) connects to or is incorporated in a digital subscriber line access multiplexer (DSLAM) that is connected to or part of the LPN. The WC-RDT provides standard analog telephone service between a plurality of standard telephone ports suitable for connection to local loop links of a plurality of customer sites and the PSTN switch through the host digital terminal. The WC-RDT is used to provide POTS service to customer sites having an RDT as well as to customer sites that do not have an RDT.

38 Claims, 8 Drawing Sheets

OTHER PUBLICATIONS

"Homeworx™ Access Platform" ADC Telecommunications, Inc., Nov., 1997, (6 pages).

"Homeworx™ Access Platform Telephone System" ADC Telecommunications, Inc., Nov., 1997, (8 pages).

"Bundling Telecommunications Services: Differentiating through value–added services now and tomorrow," Josh Soske, *VINA Technologies*, 1998, (2 pages).

"The Bundled Services Solution" *VINA Technologies*, 1998, (2 pages).

"Infrastructure for DSL Solutions," Mark Emery, *AG Communication Systems*, 1997, (10 pages).

"Voice and Data Integration—Network Consolidation Options" *Vienna Systems*, Apr. 21, 1998, (7 pages).

"Voice and Video on the LAN" *Vienna Systems*, Apr. 21, 1998, (4 pages).

"Real–Time Voice Over Packet–Switched Networks," Kostas et al., *IEEE Network*, Jan./Feb., 1998, pp. 18–27.

* cited by examiner

SYSTEM AND METHOD FOR COMMUNICATING VOICE AND DATA OVER A LOCAL PACKET NETWORK

This application is a continuation-in-part of U.S. application Ser. No. 09/112,911, filed Jul. 9, 1998, now U.S. Pat. No. 6,075,784, and claims priority to U.S. Provisional Application No. 60/088,399, filed Jun. 8, 1998.

FIELD OF THE INVENTION

The present invention is directed to a system and method for providing voice data services over an access network supporting a digital packet-based transport protocol, such as Digital Subscriber Line (DSL) technology. In addition, the present invention is directed to a system and method for providing conventional analog telephone service to supplement service provided through a digital-packet based transport network.

BACKGROUND OF THE INVENTION

Conventional or "plain old telephone signal" (POTS) telephone service is provided over an "analog loop" that carries audio communications and signaling between a customer's telephone device(s) and the telephone company's wire center. A fundamental attraction of this technology is that power for the connection is provided from the wire center, and thus, with proper stand-by power systems at that location, telephone service remains available even when the customer's power is interrupted. Additionally, only a simple, and generally very reliable, telephone set is required at the customer's location, resulting in a service that is subject to minimal interruption.

Increasingly, telephone companies have used more sophisticated digital technology to deliver telephone service; this approach requires more complex equipment at the subscriber's location and that equipment is, inherently, subject to additional failure modes and requires local powering. Typically, this equipment is installed at larger business locations where it may be practical to also install stand-by power equipment and redundant electronics, so that at least some telephone service can be maintained even when equipment or conventional power fails. The telecom industry is anxious to bring the advantages of digital technology to residential subscribers, preferably without giving up the reliability associated with conventional analog phone service. It is, generally, not cost-effective to equip the residential subscriber with stand-by power equipment and redundant electronics.

DSL is a high bandwidth technology that enables data to be transferred to and from individual subscriber locations at various speeds, currently ranging as high as 2 Mbps. Data is transferred over a DSL access portion of a local packet network (LPN) as "packets," and packets move over the LPN only when information is moving to or from the subscriber, and the line is in an idle condition otherwise. An LPN is a network that provides data connections among subscribers in a local service area with various connection types and data rates. Typically, an LPN consists of a plurality of DSL multiplexers and data switches. DSL equipment is designed to serve large numbers of subscribers, resulting in relatively low per-subscriber costs.

DSL technology is a very cost-effective mechanism for delivering high-bandwidth digital data to a residential subscriber. Some variants of DSL, in particular, Asymmetric Digital Subscriber Line (ADSL) permit the superposition of the high-bandwidth digital data stream on top of traditional analog telephone service. This is accomplished through the use of a readily available splitter/combiner device installed both at the wire center and at the subscriber's premises. Voice communications can then be provided both by the analog signal, and by additional digital channels derived from the digital stream (as explained in above). However, as noted, providing the analog voice service requires POTS-compatible equipment in the WC. Typically, this equipment is large and expensive, and requires special connections, using time-division multiplexing, to the rest of the telephone network.

The aforementioned co-pending application provides a system and methods that enable facilities-based full service Competitive Local Exchange Carriers (CLECs) to transport local telephone service, including multiple voice call service, and data services to small and medium-sized business customers over an access network that supports a digital packet-based transport protocol, preferably over existing copper wire pair lines.

A telephone company deploying the technology above may want to offer the advantages of the analog POTS capability of ADSL, but cannot cost-justify the traditional switching technology required at the wire center. They need a mechanism that leverages their investment in packet-based technology but still delivers the benefits of traditional POTS, including continuous operation even when the customer's power fails.

SUMMARY OF THE INVENTION

Briefly, the present invention is directed to a system and method for utilizing a local packet network (LPN) that supports a digital packet-based transport architecture, such as Digital Subscriber Line (DSL), to provide voice and optionally data services over a single local loop, such as a DSL, to a customer site. Multiple voice telephone calls as well as data services for a customer site are supported on a single DSL connected to that customer site.

At a customer site, a plurality of telephone devices (such as telephones, facsimile machines, modems and/or office telephone system ports) and data devices (such as those connected by a local area network) are interfaced to a local loop link connected to the LPN. Analog telephone signals (representing voice, facsimile signals, or modem signals) received from the plurality of telephone devices are converted to digital voice-band packets. Control signals representing off-hook, dial tone, call setup information, and other call control signals are converted to digital call control packets. The voice-band packets, call control packets and data packets (from the data devices at the customer site) are modulated for transmission via the local loop link over the LPN. In the reverse direction, modulated voice-band packets, data packets and call control packets received from the LPN destined for the customer site via the LPN on the local loop link are demodulated. The demodulated voice-band packets are converted to analog telephone signals for connection to appropriate ones of the plurality of telephone devices at the customer site. The demodulated data packets are coupled to the data devices (in the local area network) at the customer site. The demodulated call control packets are processed to control call setup and maintenance functions at the customer site.

At a control site within or connected to the LPN (such as a central switching facility), voice-band packets, call control packets and data packets from the customer site are received via the,LPN. The voice-band packets received from the customer site via the LPN are converted to time-division multiplexed signals and are coupled to a public switched telephone network (PSTN) switch in assigned time slots. Data packets received from the customer site are coupled to a data switch for transfer to a data network (such as the Internet). The call control packets are processed to control call setup and maintenance functions at the control site. In the reverse direction, data packets destined for the customer site are received from the data switch and coupled to the LPN for transmission to the customer site. Time-division multiplexed voice signals received from the PSTN switch destined for the customer site are converted to voice-band packets and are coupled to the LPN for transmission to the customer site.

A specialized apparatus called a remote digital terminal (RDT) is provided at the customer site and another specialized apparatus, called a host digital terminal (HDT) is provided at the central switching facility. Alternatively, the specialized functions of the HDT are integrated into a data switch in the LPN or into a PSTN switch. Similarly, the functions of the RDT can be integrated into a key telephone system/private branch exchange device or other equipment at the customer site. The RDT and HDT transport digitized voice-band packets and data packets between each other via the LPN. The RDT converts the voice-band packets suitable for communication over the LPN to and from analog telephone signals suitable for use by attached telephone devices. Similarly, the HDT converts voice-band packets to and from a time-division multiplexed format suitable for communication via the PSTN switch.

An apparatus called a wire center remote digital terminal (WC-RDT) is provided at a wire center to interface a plurality of local loop links with a digital subscriber line access multiplexer (DSLAM) in order to provide POTS service on the local loop links to customer sites. The WC-RDT is used to provide POTS service to customer sites having an RDT as well as to customer sites that do not have an RDT.

The above and other objects and advantages of the present invention will become more readily apparent when reference is made to the following description, taken in conjunction with the accompanying drawings.

DETAILED DESCRIPTION OF THE INVENTION

Figure 1:
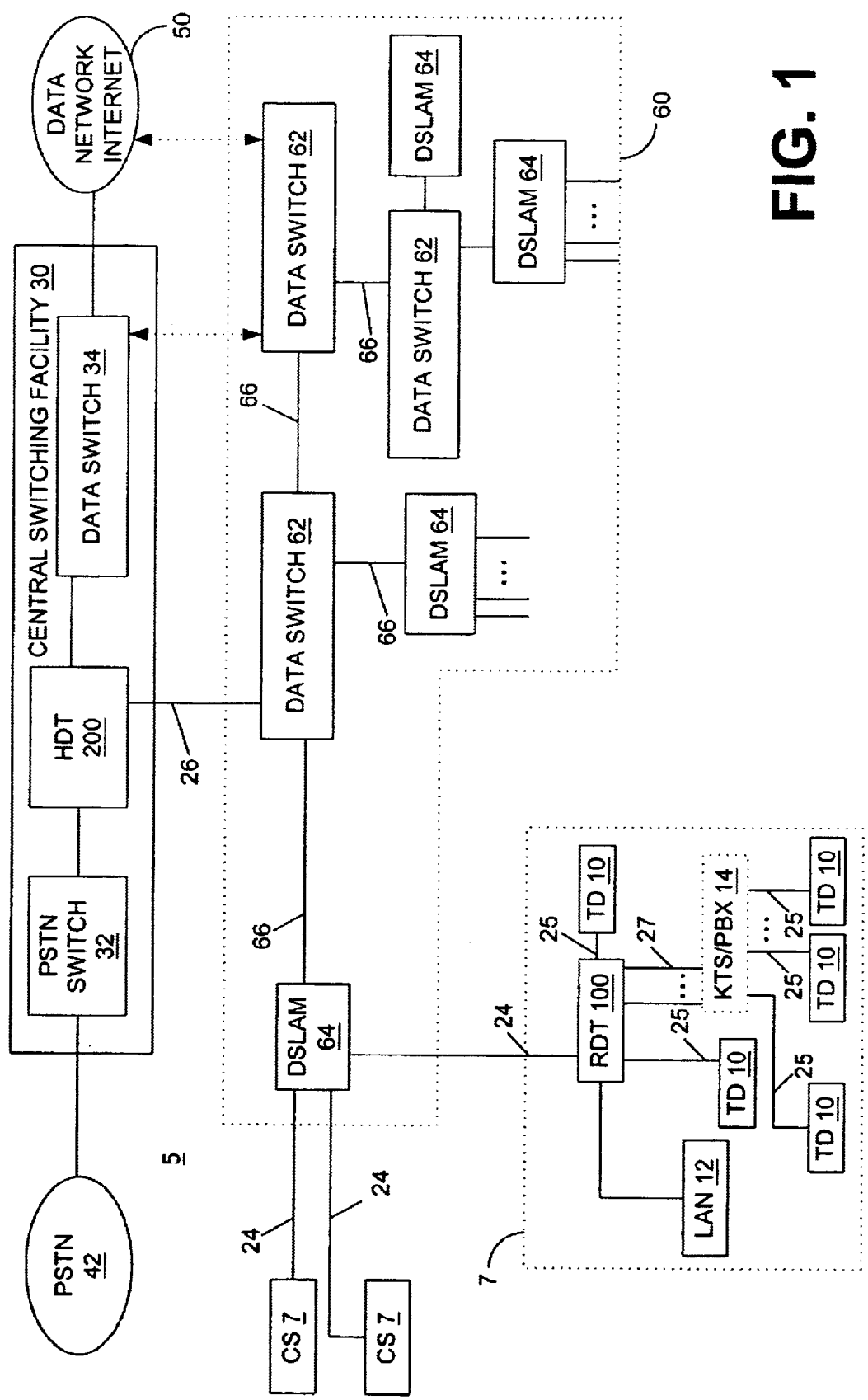
FIG. 1 is a block diagram of a telecommunication system employing the remote digital terminal and a host digital terminal of the system and method according to the present invention.

FIG. 1 is a general diagram of a system 5 that enables a facilities-based full service CLEC to transport local telephone service and data services to small and medium-sized businesses. The present invention is described as being useful in utilizing a particular type of local loop link, called the DSL network. However, it should be understood that the teachings described herein are applicable to any access network supporting a digital packet-based transport protocol. DSL is only an example of such a protocol-access network technology.

The primary components of the system according to the present invention are a remote digital terminal (RDT) 100 and a host digital terminal (HDT) 200. The RDT 100 resides at a customer (subscriber) site shown at reference numeral 7 and interfaces a plurality of telephone devices (TDs) 10 and, optionally, a local area network (LAN) 12 to a local loop link, such as a line supporting the Digital Subscriber Line (DSL) transport protocol. For simplicity, the local loop link is referred to as a DSL 24. Other local loop links that may be suitable for use in conjunction with the present invention are wireless local loops, such as digital cellular local loops, and the like.

The DSL 24 is an access network of a local packet network (LPN) 60. The LPN 60 comprises one or more data switches 62, such as Asynchronous Transfer Mode (ATM) switches, and one or more DSL access multiplexers (DSLAMs) 64. The data switches 62 consist of one or more processors controlled by software. The data switches 62 are connected to each other and to DSLAMs 64 preferably via optical links, such as synchronous optical network (SONET) facilities 66. In each ILEC central office (CO), there is a DSLAM 64 that controls the distribution (and collection) of signals to and from a plurality of DSLs 24. The combination of DSLAMs 64 and data switches 62 make up the LPN 60.

The LPN 60 provides data connections among subscribers in a local service area with various connection types and data rates. For example, the LPN might include DSL connections at rates ranging from 256 Kbps to 6 Mbps used by homes and small businesses, T3 connections at 45 Mbps used by large businesses and small Internet Service Providers (ISPs) and OC-3 connections for used by the largest businesses and ISPs.

Returning to the description of a customer site 7, the TDs 10 may connect directly to the RDT 100 or to a key telephone system/private branch exchange (KTS/PBX) device 14 that is connected to the RDT 100. Connections between the RDT 100 and the associated TDs are by standard analog telephone lines 25, or alternatively by other standard telephony interfaces such as T-1, ISDN, etc. Connections between the RDT 100 and the KTS/PBX 14 are by way of a plurality of trunks 27. The function of the RDT 100 is to allow voice traffic associated with one or more TDs 10 and data traffic from the LAN 12, if any, to be converted to and from a format that can transit the LPN 60. It should be understood that the voice-band traffic associated with the TDs 10 could be voice, modulated digital data from a modem, facsimile machine, and possibly certain call control signals (such as dial tone, busy signal, etc.). Data traffic is that traffic associated with the LAN 12 or other data-packet based devices at the customer site 7.

As is well known in the art, DSL is a telecommunication technology that enables data to be transferred from individual subscriber locations at various speeds, currently as high as 2 Mbps using the existing twisted wire pair line infrastructure already in place in most industrialized parts of the United States and the world. That is, the DSL 24 is a standard twisted wire pair line that is used to transmit information that is formatted in accordance with the DSL transport protocol.

The HDT 200 resides at control site within or without the LPN 60. For example, FIG. 1 shows the HDT residing at a CLEC switch facility 30 and interfaces a PSTN switch 32 and a data switch 34 to the fiber backbone of the LPN 60. The PSTN switch 32 may route voice calls to the local PSTN 42 or to a long distance network. The data switch 34 may route data packets to and from a data network 50, such as the Internet. The HDT 200 links via an optical fiber 26 or another facility connected to the LPN 60. The CLEC 30 switching facility is also hereinafter referred to as a central switching facility. Both the data switch 34 in the central switching facility 30 and the data network 50 may route data directly to the LPN 60, bypassing the HDT 200. Similarly, a data switch 62 in the LPN 60 may directly route data to the data network 50.

Alternatively, the functions of the HDT 200 may be incorporated into a control site at another location in the system. For example, the functions of the HDT may be incorporated into a data switch 62 of the LPN 60 rather than be performed by a separate unit. Software that carries out the functions of the HDT 200 (described hereinafter) may be provided in the data switch 62 to be executed by the processor(s) in the data switch 62. The software in the data switch 62 can be enhanced to perform the functions of the HDT 200 and interface directly to the PSTN switch 32, to the data switch 34 or to the data network 50. Similarly, the software may be provided in a PSTN switch 32 to be executed by processors associated with the PSTN switch 32.

Figure 2:
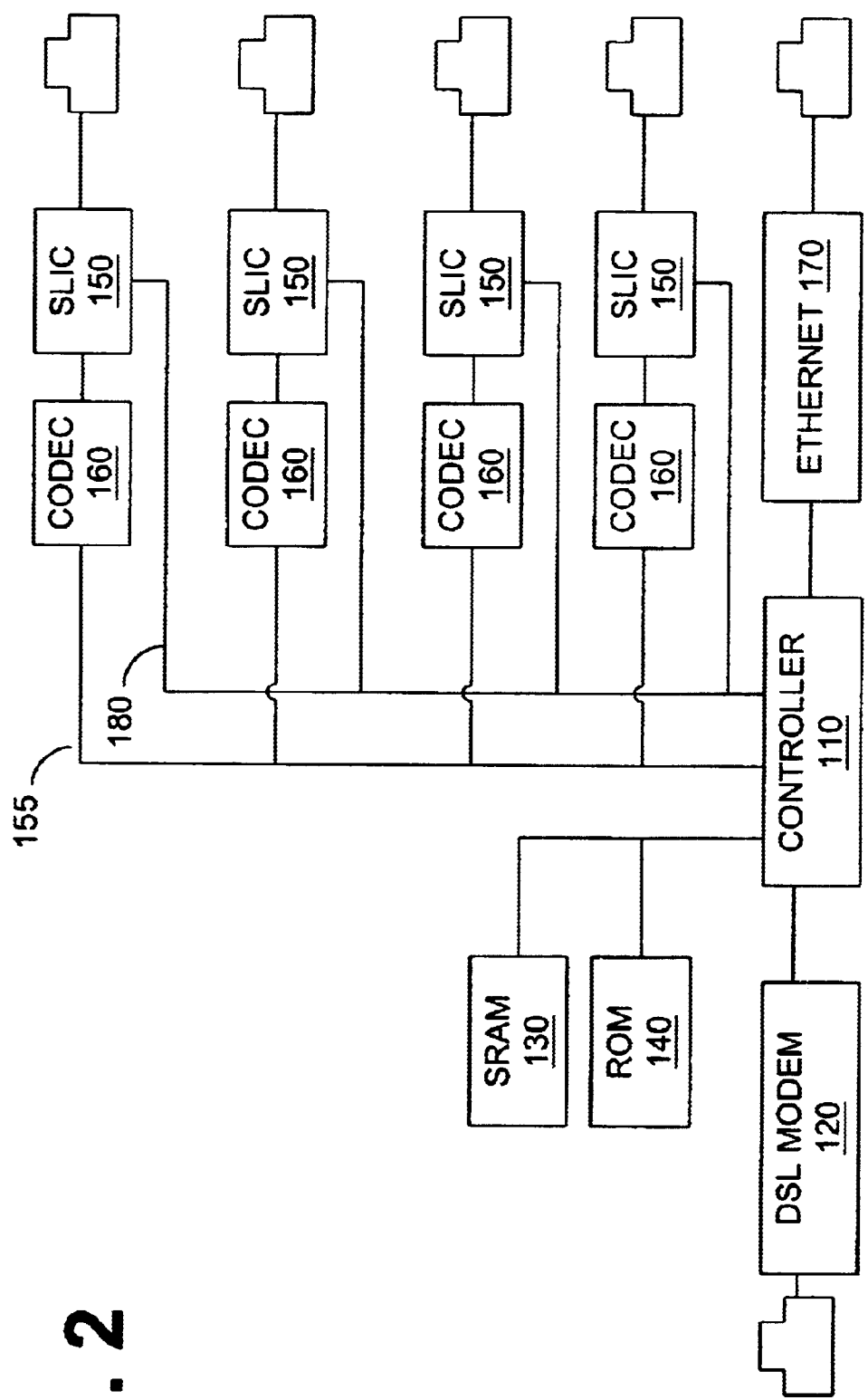
FIG. 2 is a block diagram of a remote digital terminal according to the present invention.

Turning to FIG. 2, with continued reference to FIG. 1, the components of the RDT 100 will be described. In a preferred embodiment, the RDT 100 is embodied as circuit board housed in a suitable enclosure with a power supply.

Specifically, according to a preferred embodiment, the RDT 100 comprises a controller 110, a DSL modem 120, a static random access memory (SRAM) 130 for buffering working data, a read only memory (ROM) 140 that stores a software program for the controller 110, a plurality of subscriber line interface circuits (SLICs) 150, a plurality of coder/decoders (CODECs) 160, and an Ethernet interface 170.

The DSL modem 120 connects directly to the DSL 24. The DSL modem performs the modulation and demodulation necessary to transport information via the DSL 24 into the LPN 60. There are several modulation/demodulation formats that are known in the art for use over a DSL 24. The DSL modem 120 also formats the modulated information into a suitable packet format, such as the asynchronous transfer mode (ATM) protocol for example, that is utilized by the equipment in the LPN 60 for the transport of information. Alternatively, if the local loop link is a wireless local loop link, the modem 120 would be a wireless modem capable of performing the modulation and demodulation necessary for transporting information via a wireless link. In addition, a transceiver (not shown) would be connected to the modem 120 to wirelessly transmit and receive the modulated information.

The controller 110 is connected to the DSL modem 120, the SRAM 130, ROM 140, Ethernet interface 170 and a time division multiplex (TDM) bus 180. Furthermore, the controller is connected to each of the SLICs 150 by a control bus 155 to enable the controller 110 to detect when a TD 10 goes off-hook and to command an SLIC 150 to ring a TD 10. Each SLIC 150 is connected to a TD 10 or to a PBX/KTS 14 by a standard analog telephone line. The SLIC 150 provides the precise voltages and currents required to interface to telephone devices, such as standard telephone sets, facsimile machines, etc. The CODEC 160 is a coder/decoder that converts analog telephone signals (voice and other in-band telephone signals) to digital bit streams, and converts digital bit streams to analog telephone signals. The controller 110 is connected to each of the CODECs 160 by the TDM bus 180. The number of TDs 10 serviced by the RDT 100 will determine the number of SLICs 150 and CODECs 160 required. However, as will be explained hereinafter, the number of telephone devices that may be in use at any one time depends on the bandwidth of the local loop link. The Ethernet interface 170 is a standard network interface circuit device that interfaces digital data between an attached PC or LAN 12.

The controller 110 is preferably a microprocessor that operates in accordance with software stored in the ROM 140. The operation of the controller 110 may be updated or modified by employing a reprogrammable non-volatile ROM, such as a "flash" memory, that is well known in the art. The controller 110, under control of the software program stored in the ROM 140, performs two major functions: call set-up control and voice-band data conversion.

As an alternative to the implementation shown in FIG. 2, the RDT 100 may be implemented using a PC with plug-in cards that provide the necessary interfaces (DSL, telephone, and Ethernet). Still another alternative is to provide a server computer that provides the call control functionality to a plurality of multimedia client PCs each having plug-in telephony and sound cards so that each PC can support a telephone call. Yet another alternative is to implement the functions of the controller 110 by a digital signal processor (DSP) or an application specific integrated circuit (ASIC).

Furthermore, rather than providing a plurality of individual SLICs 150, a single subscriber line interface unit capable of coupling a plurality of signals to and from a plurality of telephone devices may be employed. Similarly, a single voice conversion device having the processing capability to perform multiple conversions may be used in place of the plurality of separate CODECs 160.

The function of the RDT 100 is to allow traffic associated with one or more telephone calls to be converted to and from a form that can transit the LPN 60. More specifically, the functions of the RDT 100 include interfacing to a local loop link, such as a DSL (via an integrated or external DSL modem); converting voice-band packets to and from conventional analog telephone signals; converting data packets to and from a format suitable for transport via the LPN; processing call control functions (ringing, on-hook, and off-hook functions) to generate and detect call control packets sent or received via the LPN; providing an electrical interface to conventional telephone equipment; managing the sharing/allocation of the bandwidth on the local loop link with other (non-telephony) functions; and providing remote management and maintenance functions.

Figure 3:
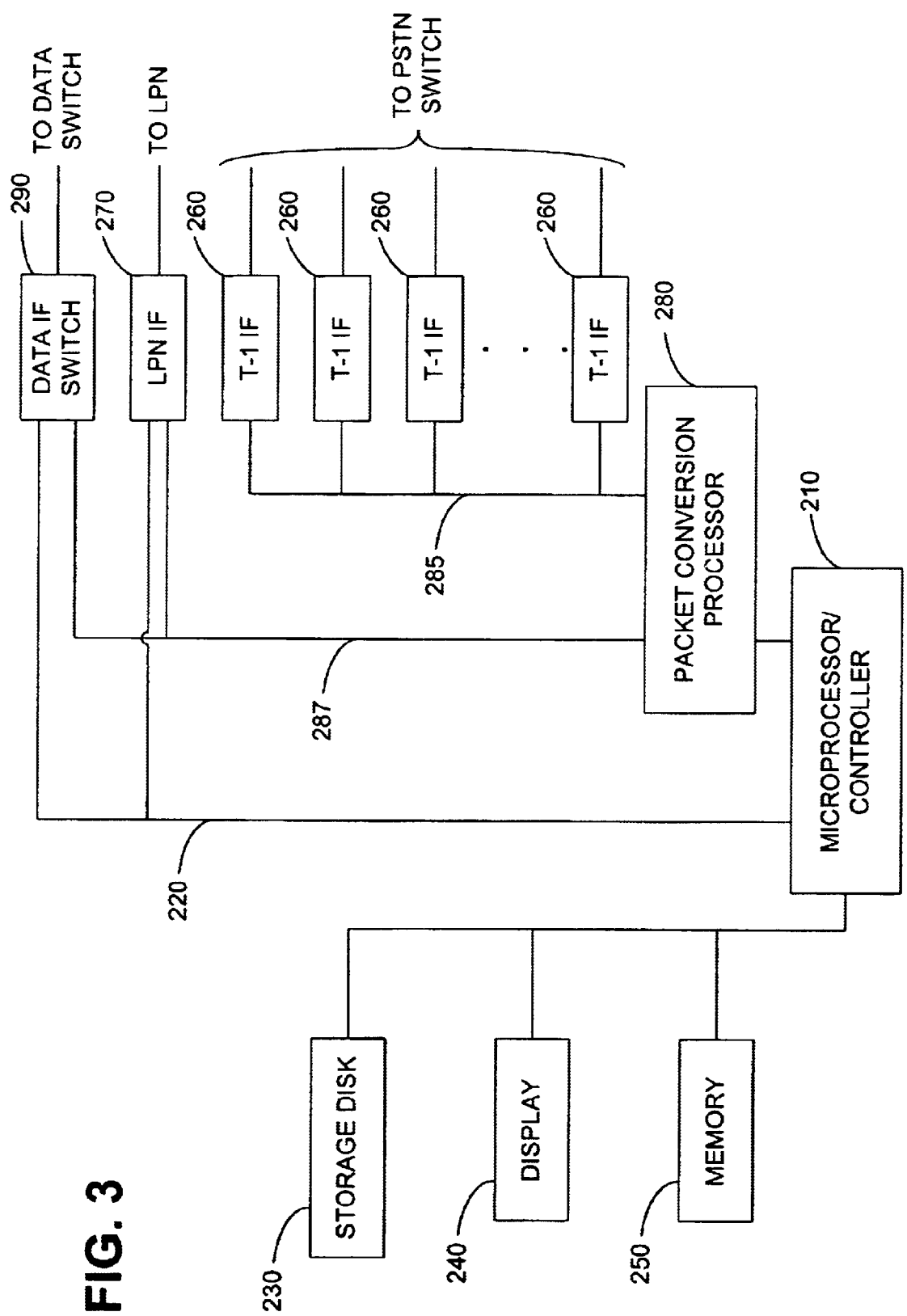
FIG. 3 is a block diagram of a host digital terminal according to the present invention.

Turning to FIG. 3, in conjunction with FIG. 1, the HDT 200 will be described. The HDT 200 performs functions complementary to those performed by the RDT 100. A single HDT 200 can support communication with a plurality of RDTs 100 that are connected to the LPN 60.

In the preferred embodiment, the HDT 200 is implemented in a conventional computer system, with specialized software controlling a set of interface electronics. Specifically, the HDT 200 shown in FIG. 3 comprises a microprocessor-based controller 210, a bus, such as a Peripheral Connection Interface (PCI) bus 220, a storage disk 230, a display 240, and a memory 250, such as SRAM. The HDT 200 interfaces to the PSTN switch 32 by a PSTN interface (IF) device, such as T-1 IFs 260, preferably communicating via the Bellcore GR-303 signaling interface. That is, the T-1 IFs 260 connect to T-1 lines, which are in turn connected to the PSTN switch 32. The HDT 200 interfaces to an optical link connected to the LPN 60 by an LPN IF device 270, such as an OC-3 optical link utilizing the Asynchronous Transfer Mode (ATM). Similarly, a data switch IF device 290 is provided to interface with the data switch 34. PC-cards implementing the functions of the LPN IF device 270 and data switch IF 290 are plugged into the PCI bus 220.

The LPN IF device 270 connects to the LPN 60 via an optical fiber (FIG. 1) and provides a data transfer rate of 155 Mbps in each direction. ATM cells are sent and received over the link, wherein each cell contains address information, including source and destination information, as well as the data to be transferred. Alternatively, the LPN IF device 270 operates at other rates, such as OC-12 at 622 Mbps, Fast Ethernet (100 Mbps) or Gigabit Ethernet (1000 Mbps.) However, the preferred embodiment is lo the ATM-155 standard.

The T-1 IFs 260 are coupled to a packet conversion processor 280 by a TDM bus 285. Similarly, the data switch IF 290 and LPN IF 270 are coupled to the packet conversion processor 280 by a TDM bus 287. The function of the packet conversion processor 280 is to convert information between different formats used by the devices connected to it. For example, the packet conversion processor 280 converts packets received from the LPN via the LPN IF 270 to a time-divisional multiplexed format for coupling to the T-1 IFs 260. Similarly, the packet conversion processor 280 converts packets received from the LPN IF 270 to a suitable format for coupling to the data switch IF 290. The packet conversion processor 280 performs these conversions in reverse as is appropriate. The packet conversion processor 280 is preferably implemented by an application-specific processor, and its operation is supervised by the microprocessor/controller 210 for call control functions, call setup, system errors and other matters. In some configurations, the function of the packet conversion processor 280 may be included within the functionality of the microprocessor 210.

The T-1 facilities connected to the PSTN switch 32 are logically divided into "time-slots" using time-division multiplexing. Each T-1 line carries 24 time-slots or channels, with each channel carrying a single digitized voice conversation. One or more of the 24 channels is designated a control channel and carries signaling information between the HDT 200 and the attached PSTN switch 32. Use of the control channel is described in more detail hereinafter.

Preferably, the HDT 200 is designed to have a modular architecture that is easily scaleable. The HDT 200 can cost-effectively support as few as 100 end user lines and 24 trunks to the voice switch 32, and up to as many as 6,000 lines and 2,000 trunks. Additional HDTs can be added to handle as many as 100,000 lines or more. The HDT 200 is preferably designed to provide "carrier-class" availability, including redundant and "hot-swappable" components. It is preferably a NEBS level 3 compliant rack-mounted system designed to reside in a central office environment and can be engineered to have N+1 redundancy.

A software program stored in the memory 250 allows the microprocessor 210 to perform the control functions analogous to the call set-up and functions performed by the RDT 100, and to support communication with multiple RDTs 100 simultaneously. As mentioned above, software to carry out the functions of the HDT 200 may be incorporated directly into the PSTN switch 32 or into the data switch 62 such that a separate "box" to carry out the functions of the HDT 200 would not be needed.

The operations of the RDT 100 and HDT 200 are described with reference to FIGS. 4–7, together with FIGS. 1–3. In order to transport voice and data services via the DSL access portion through the LPN 60, the RDT 100 and HDT 200 employ a compatible digital signaling and information transfer protocol. There are many such protocols well known in the art of telecommunications, and it is likely that many new protocols will be created that may be useful in connection with the system and method of the present invention. The ATM protocol is the example of a suitable protocol. The ATM protocol is a format that divides a bandwidth into a plurality of cells each of which may contain voice-band packets, data packets, call control packets, etc.

The local loop link supports in each direction the transport of voice-band packets representing analog voice-band telephone signals, data packets associated with data devices (computers in a LAN) and call control packets. A voice-band packet includes an identifier (source and destination) and the voice-band packet information. A call control packet includes a control flag (identifying it as a control message), a control message (off-hook, busy, etc.) and an identifier associated with the call to which the control message applies. If the ATM protocol is used, each packet occupies an ATM cell. Upon receiving a packet, the RDT 100 and HDT 200 first detect the type of packet received (by a control flag or other identifying information) in order to determine whether the packet represents call control functions, voice-band information or data information. The RDT 100 converts analog telephone signals to and from a suitable digital packet format in order to communicate with the attached analog TDs 10. In addition, if communication with data devices at the customer site is supported and required, the RDT 100 converts data packets from the data devices to and from a suitable packet format for communication via the LPN. Similarly, the HDT 200 converts voice-band information and data packets between different types of digital formats in order to conduct communications via the PSTN switch 32 and the data switch 34.

Figure 4:
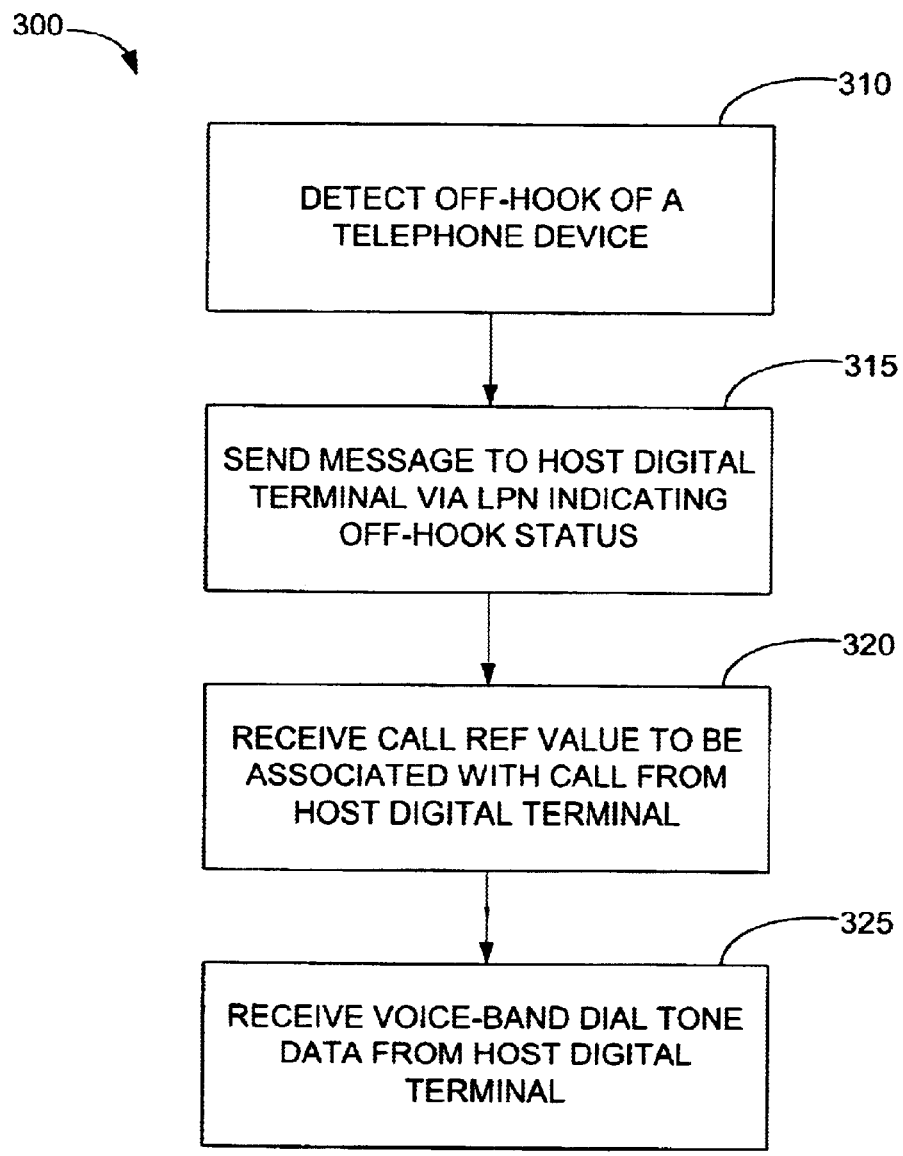
FIG. 4 is a flow chart depicting a call set-up procedure in the remote digital terminal.

Turning to FIG. 4, with reference to FIG. 2, a call-setup procedure 300 in the RDT 100 is described. This procedure occurs when a call is initiated by one of the TDs 10 connected to the RDT 100. In step 310, an SLIC 150 detects that a connected TD 10 is off-hook, and a corresponding signal is coupled to the controller 110. The controller 110, in step 315, generates a control message (formatted into a call control packet) indicating the off-hook status and requesting a dial-tone, that is transmitted to the HDT 200 via the LPN 60. The controller 110, in doing this, first determines whether there is available bandwidth on the DSL 24 based on the number of other voice calls currently being maintained by the RDT 100. If there is available bandwidth, then the message is sent to the HDT 200; otherwise, a "busy" or other signal indicating unavailability is sent to that telephone device.

Next, in step 320, the RDT 100 receives a call control packet from the HDT 200 that includes a call reference value to be associated with that call. In step 325, a call control packet or voice-band packet (depending on the system implementation) representing a voice-band dial-tone is received from the HDT 200 that is converted to a digital bit stream by the RDT 100, converted to an analog dial-tone signal by the CODEC 160 and connected to the TD 10 by the SLIC 150.

Figure 5:
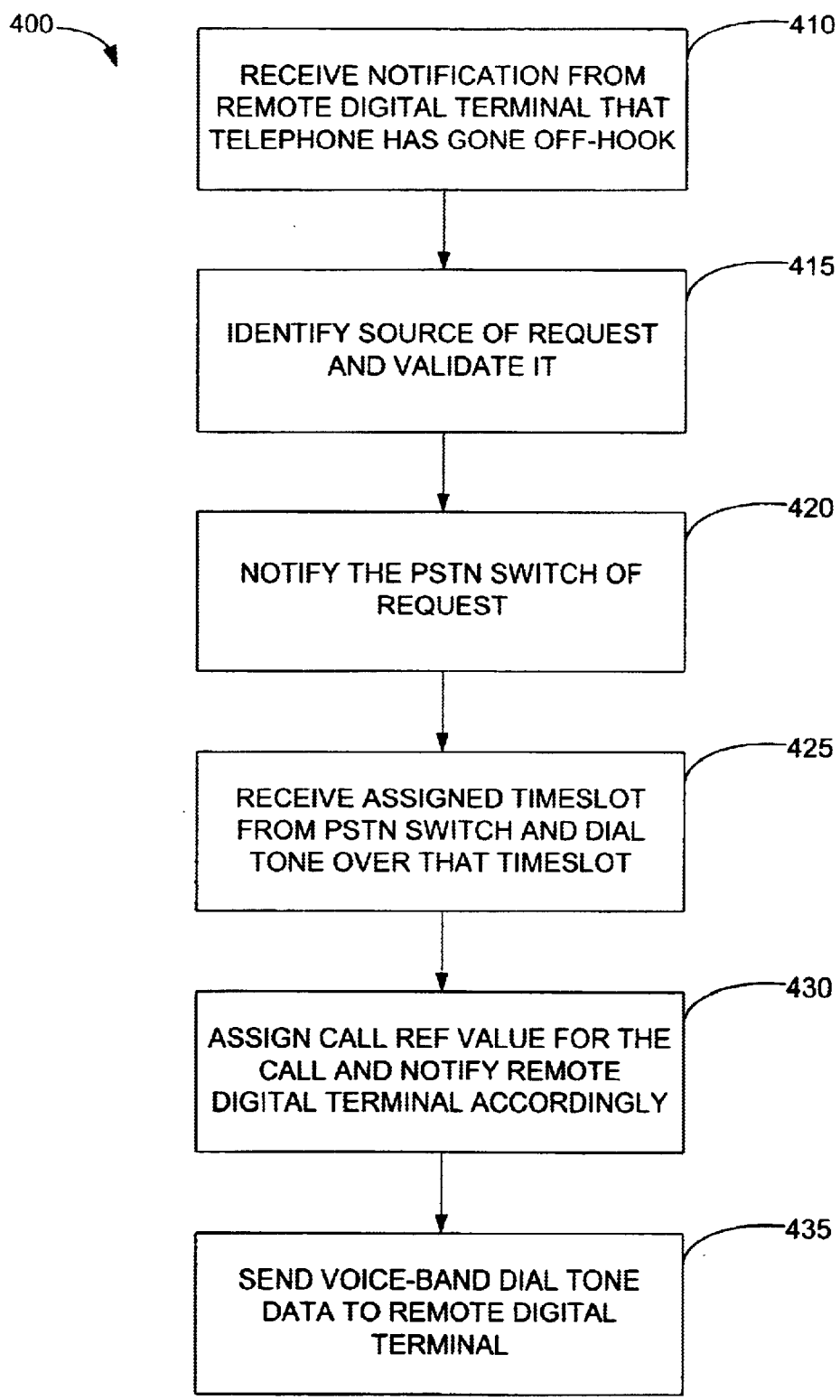
FIG. 5 is a flow chart depicting a call-set up procedure in the host digital terminal.

FIG. 5 illustrates the complementary call set-up procedure 400 in the HDT 200, again, in the case when a call is initiated by a telephone device connected to the RDT 100. The use of the ATM protocol is referred to in the following description as an example of a suitable networking technology used by the LPN. Reference is also made to FIG. 3 in connection with this description. In step 410, the HDT 200 receives the call control packet containing a control message from the RDT 100 indicating that a telephone device has gone off-hook. In step 415, the HDT 200 identifies the source of the call control message by looking at the address provided in the ATM cell containing the call control packet request. It is verified whether the request is valid, i.e., coming from a customer site 7 whose account is active. In step 420, the HDT 200 notifies the PSTN switch 32 via the designated control channel over one of the T-1 IFs 260 of the request. In reply, the PSTN switch 32 assigns an available time-slot for the call on one of the T-1 facilities, and this time-slot information is received by the HDT 200 in step 425, together with a dial-tone over that time-slot. Next, in step 430, the HDT 200 assigns a call reference value for the call and communicates that value in a control message that is transmitted to the RDT 100. Finally, in step 435, the HDT 200 generates voice-band packet(s) representing a dial-tone for the call and transmits it to the RDT 100.

Calls that are initiated by devices on the HDT side of the system are received by the HDT 200 when the PSTN switch 32 detects a match between a received telephone number and a table of telephone numbers assigned to a customer site within the supervisory control of the HDT 200. In response, the HDT 200 transmits to the RDT 100 a call control packet containing a command for a ringing signal that is interpreted by the RDT 100 to generate an analog ringing signal for connection to the appropriate TD 10. A call reference value is assigned, and voice-band packets are exchanged between the HDT 200 and RDT 100 in a manner analogous to that described for a call initiated at the RDT 100. When the addressed telephony device at the RDT 100 goes off-hook, the RDT 100 generates a control packet indicating same, and the HDT 200, upon receipt of that packet, notifies the PSTN switch 32 that the call has been answered. Thereafter, the operation of the RDT 100 and HDT 200 continues as explained below. The communication of a data packet to a data device at the customer site is initiated in an analogous manner when the data switch 34 receives a data packet destined for a data device at the customer site.

It should be understood that the "telephone numbers" associated with the TDs 10 connected to the RDT 100 are managed by the PSTN switch 32 located in the central switching facility 30. When a person somewhere in the PSTN 42 dials a number, such as 404-555-1234, traditional PSTN technology routes that call to the PSTN switch 32, which in turn presents the call information, as described herein, to the HDT 200, for transmission to the RDT 100 and ultimately to the connected TD 10. Thus, the TDs 10 connected to the RDT 100 operate identically to telephone devices connected directly to the central switching facility 30, and can make and receive PSTN telephone calls in the traditional fashion.

Once a call between the RDT 100 and HDT 200 is set up, remaining communication will consist primarily of voice-band packets or data packets depending on the end devices communicating with each other until the call is terminated. In general, only when new calls are initiated, calls are terminated, or system errors occur will call control packets occur over the local loop link.

Figure 6:
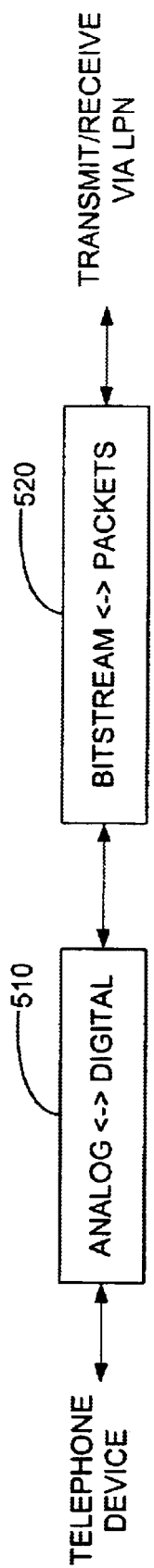
FIG. 6 is a flow chart depicting processing of voice-band data in the remote digital terminal.

The operation of the RDT 100 once a call is set-up is described with reference to FIG. 6, in conjunction with FIGS. 1 and 2. There are two major conversion processes that occur at the RDT 100: analog-to-digital and digital-to-analog conversion shown at step 510, and digital bit stream-to-packet and packet-to-bit stream conversion at step 520. The analog-to-digital (and vice versa) conversion is performed by the CODECs 160 for the analog telephone signals. Some call control related telephone signals are generated by the controller 110 via the SLICs 150. The bit stream-to-packet (and vice versa) conversion is performed by the controller 110.

To explain further, the flow of signals from a TD 10 to the LPN 60 is first described. Analog telephone signals from an attached TD 10 are received and digitized by the attached CODEC 160, creating a digital bit stream representing the real-time analog telephone signals generated by the TD 10. The digital bit stream is placed on the TDM bus 180. In step 520, the digital bit stream is converted into digital packets called voice-band packets. Each voice-band packet contains a plurality of bytes of voice-band information, each representing a sample of the speech (or analog telephone signals) at a predetermined time interval, such as (125) microsec. A single voice-band packet contains a predetermined number of samples of voice information, such as 40, representing 5 msec. of speech, for example. More specifically, the controller 110 accepts 1 byte of digital data from the TDM bus 180 each 125 microsec., and buffers the information in the SRAM 130. When a full packet of voice information is accumulated in the SRAM 130, the controller 110 formats the packet with its associated call reference value and transfers it to the DSL modem 120, causing it to be modulated and transmitted via the LPN 60 to the HDT 200. The controller 110, under control of the software stored in the ROM 140, carries out this process for all calls that are active at the RDT 100. Similarly, when the controller 110 receives data packets via the Ethernet interface 170 from the LAN 12, it buffers them in the SRAM 130 for modulation by the DSL modem 120 and transmission via the LPN 60. Depending on the availability of bandwidth on the DSL 24, the controller 110 may buffer the digital data from the LAN 12 until sufficient bandwidth becomes available, giving priority to the voice-band information.

The controller 110 carries out this process for each of the TDs 10 which is active at any given time, sequencing through each CODEC 160, accumulating a voice-band information for each call, and passing it to the DSL modem 120 for transmission when it is filled. Construction of the packets is skewed by the controller 110 such that all packets are not ready for transmission simultaneously; rather, a packet for a first call is completed, and then the packet for the next call is completed a fraction of a second later, allowing the packet for the first call to be transmitted by the DSL modem 120 so that it is ready to accept the packet for the next call when it is ready. Alternatively, the voice-band data for several calls may be multiplexed together into a single voice-band packet that contains identifiers to each.call and data for each call. This alternative technique reduces any potential delay that may occur as a result of the packetizing process.

In the reverse direction, the DSL modem 120 receives modulated voice-band packets and data packets transmitted over the DSL 24 from the central switching facility 30. The DSL modem 120 demodulates the modulated voice-band packets and modulated data packets and couples them to the controller 110. The controller 110 receives the demodulated voice-band packets and data packets, and identifies voice-band packets by the call reference value contained therein. The controller 110 stages the voice-band packets in SRAM 130, queuing subsequent voice-band packets as they are received. Simultaneously, the controller 110 takes individual bytes of data from the SRAM 130 and places them onto the TDM bus 180 at the rate of 1 byte every 125 microsec. for connection to an appropriate one of the CODECs 160 associated with the addressed TD 10. The CODEC 160 converts the digital bit stream data to analog telephone signals, which are coupled by the SLIC 150 to the TD 10.

With respect to the received data packets, when the controller 110 detects the reception from the DSL modem 120 of a data packet not associated with telephony functions, it directs it to the Ethernet interface 170 where it is coupled (according to an associated address) to the appropriate data device in the LAN 12.

The RDT 100 sets the priority for utilization of the bandwidth of the local loop link between voice traffic and data traffic. For example, the controller 110 may be programmed to assign priority of use of the local loop link to voice traffic over data traffic. In this case, bandwidth over the DSL connection will be used for voice calls when they are active, but will be available for data traffic when some of the TDs 10 are idle. Typically, the bandwidth of a DSL is as high as 2 Mbps. The controller 110 may designate a portion of that bandwidth for voice traffic, for all or adjustable time periods during a day. Once the data traffic maximum is reached, no further data traffic would be permitted. These traffic parameters are programmable in the RDT 100, and if necessary, can be adjusted in real-time to accommodate sudden bandwidth allocation needs.

Figure 7:
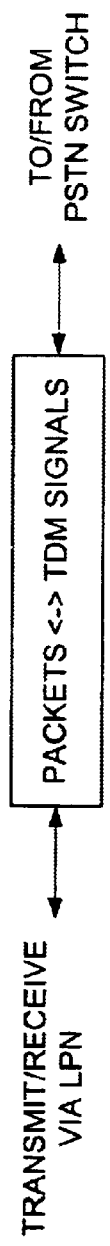
FIG. 7 is a flow chart depicting processing of voice-band data in the host digital terminal.

With reference to FIG. 7, in conjunction with FIGS. 1 and 3, the operation of the HDT 200 in processing ongoing calls is described. Voice-band packets and data packets sent by the RDT 100 via the LPN 60 are received by the LPN IF 270. The packet conversion processor 280 converts the voice-band packets to time-division multiplexed (TDM) signals in a process similar to that in the RDT 100, and couples the TDM signals via a T-1 IF 260 to the PSTN switch 32 in an assigned time-slot. Data packets received from the RDT 100 are (reformatted if required by the packet conversion processor 280 and) coupled to the data switch 34 by the data switch IF 290 under control of the microprocessor 210.

In the reverse direction, the HDT 200 receives TDM signals for a given call from a T-1 IF 260 at a rate of one byte every 125 microsec. In a process similar to that in the RDT 100, the packet conversion processor 280 buffers the bytes of data of the TDM signals in the memory 250 to form voice-band packets, which are then dispatched to the RDT 100 via the LPN IF device 270. Data packets received from the data switch 34 are coupled to the LPN IF device 270 for transmission to the customer site.

The HDT 200 may also be involved in bandwidth usage control. For example, the microprocessor 210 may be programmed to continuously monitor the amount of bandwidth of the local loop link used by a given RDT 100 at customer site for voice traffic to determine remaining bandwidth availability on the local loop link for data traffic. The microprocessor 210 may be programmed to limit data traffic to the customer site from the LPN such that a predetermined portion of the total bandwidth available to the customer site on the local loop link used by that RDT 100 remains available for voice traffic. Furthermore, the microprocessor 210 may be programmed to generate a message to be sent to a data switch 62 in the LPN 60 indicating the amount of bandwidth available for data so that the data switches 62 in the LPN 60 can abide by this rule in transmitting (or not transmitting) data traffic to the HDT 200 destined for a particular RDT 100 at a particular customer site.

In order to be competitive in the local market, CLECs must deliver service that is of the same quality as that which the customer is currently receiving from the ILEC. To achieve this, the system of the present invention digitizes voice conversations using standard "$\mu$-law" encoding (64 Kbps) and need not use voice compression (though compression can be used if it is desired to reduce the bandwidth utilization through the LPN). In addition, to avoid the delays (latency) inherent in some packet networks, the system according to the preferred embodiment uses ATM signaling and is optimized throughout to limit buffer sizes and queues, insuring that voice-band data moves expeditiously between the RDT and HDT.

Figure 8:
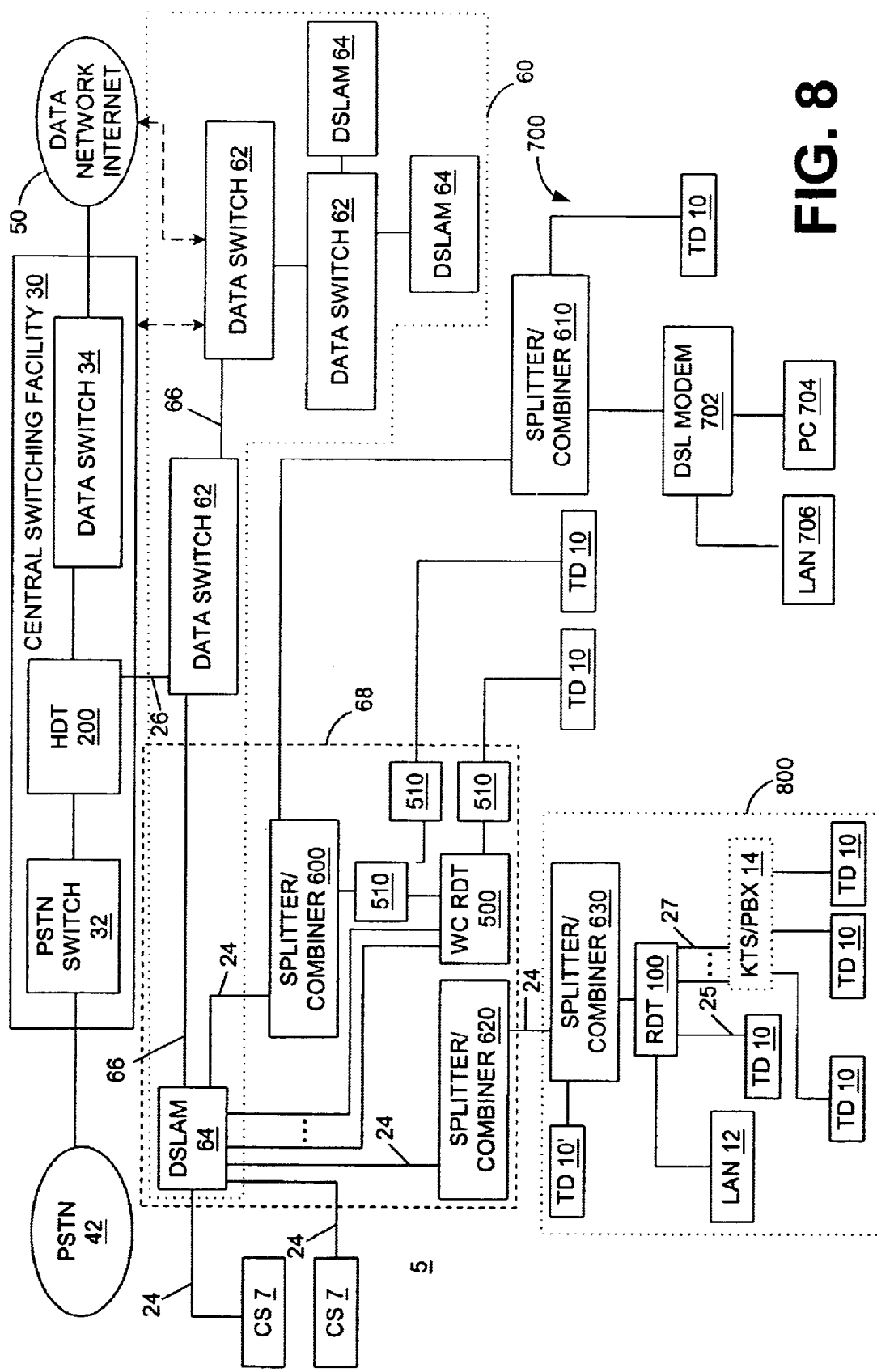
FIG. 8 is a block diagram showing an enhancement to the system wherein a wire center remote digital terminal is provided at a wire center to provide standard analog service to customer sites without a remote digital terminal, or for customers equipped with a remote digital terminal, even if their remote digital terminal becomes inoperative.
Figure 9:
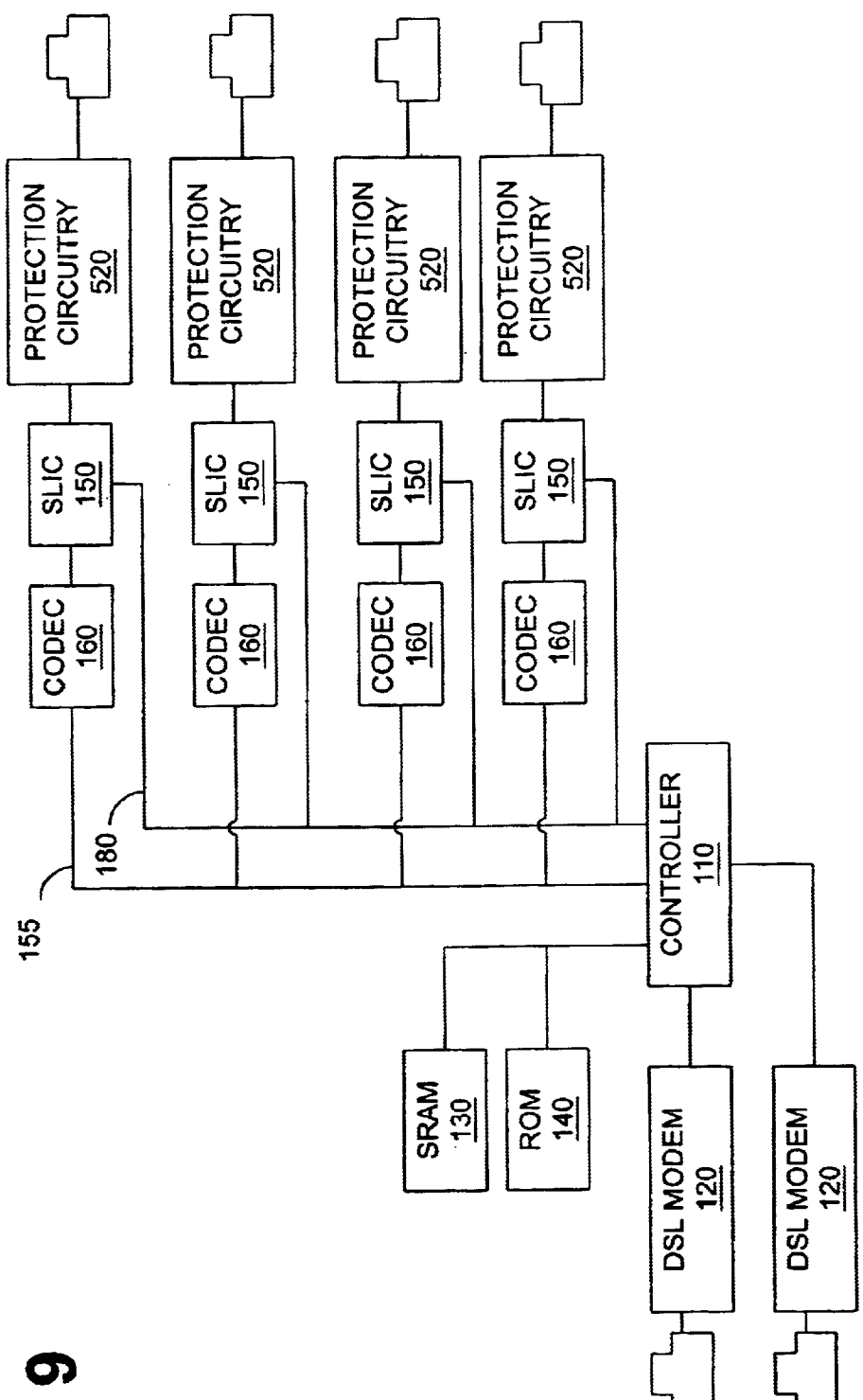
FIG. 9 is a block diagram of the wire center remote digital terminal.

Turning to FIGS. 8 and 9, the wire center remote digital terminal (WC-RDT) is described. The WC-RDT is similar to the RDT, with some modifications, and is located at the wire center (WC) shown, for example, at reference numeral 68 in FIG. 8. The WC-RDT 500 connects to a multiplexer in the WC 68, such as a DSLAM 64 and provides POTS interfaces for a large number of subscribers.

The WC-RDT 500 is shown in FIG. 9. It is similar to the RDT 100 shown in FIG. 2, but lacks the Ethernet port 170. The WC-RDT 500 comprises a plurality of subscriber line interface circuits 150 each suitable for connection to the local loop links of a plurality of customer sites via one of the plurality of standard telephone (POTS) ports 510, and a plurality coder/decoders 160 each for connection to a subscriber line interface circuit 150. Each coder/decoder 160 is capable of converting analog telephone signals received from an associated subscriber line interface circuit 150 to digital bit streams and converting a digital bit stream to analog telephone signals to be supplied to the associated subscriber line interface circuit.

A controller 110 is coupled to the coder/decoders 160 and to the subscriber line interface circuits 150. The controller 110 manages the interface of voice-band packets between the DSLAM 64 and the plurality of POTS ports 510. Multiple DSL modems 120 may be provided in the WC-RDT 500 to handle higher capacity through multiple connections to the DSLAM 64. The WC-RDT 500 is very compact, and can be implemented in a rack-mounted form factor such that very high port densities can be achieved. Alternatively, the functions of the WC-RDT 500 can be integrated into a DSLAM 64.

Likewise, the operation of the WC-RDT 500 is similar to that of the RDT 100. The controller 110 managing the interface of voice-band packets between the DSLAM 64 and the plurality of standard telephone ports by: converting digital bit streams received from one or more coder/decoders 160 to voice-band packets and coupling the voice-band packets to the LPN for transmission to the host digital terminal 200; and converting demodulated voice-band packets received by the DSLAM 64 to digital bit streams and coupling the digital bit streams to an appropriate one of the coder/decoders 160.

The WC-RDT 500 is powered by the power facilities of the wire center 68 where the DSLAM 64 is located. These facilities are generally highly reliable, and include batteries and back-up generators to assure operation even during commercial power failures. The WC-RDT 500 need not be equipped with connectivity for a LAN, unlike the RDT 100. The wire center 68 may be a large neighborhood building that houses switching systems and other communications equipment, or could be a cabinet or vault that houses a DSLAM 64 that provides connections to subscriber loops and includes a high-availability power system.

The WC-RDT 500 is connected to a DSLAM 64 by any available technology supported by the DSLAM, including the same technology used by the RDT 100. In fact, DSL technologies are somewhat sensitive to distance, and therefore tend to provide higher bandwidth capacity when the distance between two devices is shorter. When both the WC-RDT 500 and the DSLAM 64 are located in the same room of a wire center facility, the DSL technology can be expected to perform at its highest capacity. For example, using available and relatively inexpensive symmetric DSL technology, the bandwidth can be as high as 2.048 Mb/sec in each direction. More than one link can be provided between a WC-RDT 500 and a DSLAM, thereby providing additional bandwidth in the connection. The WC-RDT 500 can use this additional bandwidth to serve more POTS ports or lines to more subscribers. In addition, multiple links between the WC-RDT 500 and the DSLAM 64 provide redundancy to maintain the reliability of the network.

Referring back to FIG. 8, the WC-RDT 500 communicates with the HDT 200 in the central switching facility 30. Telephone service for each POTS port 510 of the WC-RDT is provided by the HDT 200 according to the operations described above with reference to FIGS. 3 and 4. No additional transport or switching facilities are needed. The HDT 200 communicates with the WC-RDT 500 in the same manner that it does with the RDT 100. However, the WC-RDT provides POTS-like service on the ports 510 such that from the perspective of a subscriber who connects a TD 10 to a port 510, the port 510 acts just like any POTS port. Still, a subscriber who also has a RDT 100 can take advantage of the bandwidth provided to have multiple voice lines and data connections, and have back-up POTS service on at least one line that will survive a failure of the RDT 100 for power outages, etc.

The primary purpose of the WC-RDT 500 is to provide POTS service (analog telephone signals) to a plurality of TDs 10 located anywhere in the coverage area of a DSLAM 64. The CLEC has several service delivery options. First, to deliver conventional POTS service to a subscriber, the telephone company or CLEC connects a TD 10 directly to a POTS port 510 on the WC-RDT 500, as shown in FIG. 8.

Second, to deliver DSL data service and a single line of POTS service to a subscriber site such as the one shown at reference numeral 700, a subscriber's loop is connected to a splitter/combiner 600 at the wire center 68, which splits the signal from the subscriber site into two instances, one of which is connected to a POTS port 510 of the WC-RDT and the other is connected to a subscriber port of the DSLAM 64. At the subscriber site 700, another splitter/combiner 610 is provided that connects to the subscriber's loop and splits it into two instances to connect to a TD 10 to provide POTS service thereto, and to a DSL modem 702. The DSL modem 702 may connect to a PC 704 and/or a LAN 706. Thus, the subscriber site 700 receives conventional POTS service to a standard analog TD 10, and DSL data service to the PC 704 or LAN 706.

Third, to deliver multi-line voice service, POTS service and DSL data service to a subscriber site such as the one shown at reference numeral 800, the subscriber's loop is connected to a splitter/combiner 620 at the wire center 68. The splitter/combiner 620 splits the signal from the subscriber site into two instances, one of which his connected to a POTS port 510 of the WC-RDT 500 and the other is connected to a subscriber port of the DSLAM 64. Likewise, at the subscriber site 800, a splitter/combiner 630 is provided to split the signal into two instances, one of which is connected to the RDT 100, and the other is connected to a standard analog TD 10'. Therefore, at the subscriber site 800, the TD 10' receives POTS service, whereas the TDs 10 receive voice service through the RDT 100. Moreover, DSL data service is provided to the LAN 12 or PC via the RDT 100.

The WC-RDT 500 is scaled to provide many POTS connections. It is unlikely that all of the subscribers using TDs 10 and 10' (connected to the WC-RDT 500 via ports 510) will use their POTS connections simultaneously. Therefore, the capacity of the DSL link between the DSLAM 64 and the WC-RDT 500 can be oversubscribed. For example, if each DSL link can support 16 simultaneous voice conversations, and the WC-RDT 500 services two DSL links between it and the DSLAM 64, then the CLEC may choose to connect 128 POTS ports on the WC-RDT 500, knowing that almost never will more than one-quarter of the subscribers attempt to use their POTS connections at the same time. As the number of subscribers in any region serviced by a particular wire center (DSLAM or group of DSLAMs) increases, additional WC-RDTs 500 can be installed.

Furthermore, each POTS port 510 on the WC-RDT 500 is equipped with protection circuitry 320 to provide lightening and over-voltage protection. Protection circuitry of this type is well known in the art. This is in contrast to the RDT 100 which does not include such protection circuitry on its POTS ports at the SLICs 150 because the POTS-like phone services provided by the RDT 100 are provided locally within the same building. However, connections to the WC-RDT 500 are made over "outside plant" facilities (standard telephone lines). These lines may be struck by lightening or otherwise shorted to a high-voltage supply. Therefore, to protect the circuitry of the WC-RDT 500, suitable protection circuitry is added between the SLICs 150 and the associated connecting POTS port 510 (FIG. 2).

In summary, the present invention is directed to a method for communicating voice to and from at least one customer site over a local packet network (LPN) supporting a packet-based transport protocol. At a customer site, a plurality of telephone devices are interfaced to a local loop link, such as a DSL or wireless local loop, connected to the LPN. Analog telephone signals received from the plurality of telephone devices are converted to voice-band packets and the voice-band packets are modulated for transmission via the local loop link over the LPN. In the reverse direction, modulated voice-band packets received from the LPN on the local loop link are demodulated. The demodulated voice-band packets are converted to analog telephone signals for connection to appropriate ones of the plurality of telephone devices. In addition to the communication of voice, the method further supports the communication of data to and from data devices (which data devices may be part of a local area network) at the customer site. Data packets from the data devices are modulated and transmitted via the LPN. In the reverse direction, data packets received from the LPN are demodulated and coupled to the data devices (in the local area network) at the customer site.

At a control site within the LPN (such as a.data switch in the LPN) or connected to the LPN (such as a HDT or a PSTN switch at a central switching facility), voice-band packets (and optionally data packets) from the customer site are received (via the LPN if the control site is external to the LPN). The voice-band packets received from the customer site via the LPN are converted to time-division multiplexed signals and are coupled to a public switched telephone network (PSTN) voice switch in assigned time slots. Data packets received from the customer site are (reformatted if necessary and) coupled via a data switch to a destination data network, such as data network. In the reverse direction, data packets destined for the customer site are received from a source data network via the data switch connected to the source data network, such as data network. Time-division multiplexed signals received from the PSTN switch destined for the customer site are converted to voice-band packets and are coupled to the LPN 60 for transmission to the customer site. Similarly, data packets received from the source data network via the data switch are coupled to the LPN for transmission to the customer site.

Furthermore, at a wire center in or connected to the LPN, POTS service is provided to a customer site by connecting to one or more subscriber line ports of a multiplexer at the wire center; providing one or more standard telephone ports for connection to the local loop links of one or more customer sites; demodulating modulated voice-band packets transmitted from the control site via the LPN and received at the one or more subscriber line ports of the multiplexer; converting the demodulated voice-band packets to analog telephone signals for connection to the one or more local loop links of the one or more customer sites; converting analog telephone signals received on the local loop links from the one or more customer sites to voice-band packets and modulating the voice-band packets; and coupling the modulated voice-band packets to the one or more subscriber line ports of the multiplexer for transmission over the LPN to the control site.

Another method according to the present invention involves communicating voice over a local packet network (LPN) to and from at least one customer site connected to the LPN via a local loop link. At a wire center in or connected to the LPN, the following steps are performed: connecting to one or more subscriber line ports of a multiplexer located at the wire center; providing one or more standard telephone ports for connection to the local loop links of one or more customer sites; demodulating modulated voice-band packets received from at the one or more subscriber line ports of the multiplexer; converting the demodulated voice-band packets to analog telephone signals for connection to the one or more local loop links of the one or more customer sites; converting analog telephone signals received on the local loop links from the one or more customer sites to voice-band packets and modulating the voice-band packets; and coupling the modulated voice-band packets to the one or more subscriber line ports of the multiplexer for transmission over the LPN to the control site. At a control site within or connected to the LPN, the following steps are performed: receiving voice-band packets from the wire center via the LPN; converting voice-band packets received from the wire center to time-division multiplexed signals and coupling the time-division multiplexed signals to a public switched telephone network (PSTN) switch; and converting time-division multiplexed signals received from the PSTN switch destined for the wire center to voice-band packets and coupling the voice-band packets to the LPN for transmission to the wire center.

Similarly, the present invention is directed to a system for communicating voice and data over an LPN to and from at least one customer site (usually a plurality of customer sites) connected to the LPN via a local loop link, comprising:
a remote digital terminal at the customer site, the remote digital terminal interfacing a plurality of telephone devices at the customer site to the local loop link to transmit and receive voice via the LPN; and a host digital terminal at a control site within or connected to the LPN that interfaces voice calls between the remote digital terminal and a public switched telephone network (PSTN) switch via the LPN.

The system may support the further transport of data between data devices (which may be part of a local area network) at the customer site and a data network within the LPN or a data network connected to the host digital terminal. Suitable hardware and the associated control functions required in the remote digital terminal and host digital terminal for transporting voice traffic and data traffic to and from a customer site are described above.

Further, in this system, a wire center remote digital terminal is provided. The wire center remote digital terminal connects to or is incorporated in a digital subscriber line access multiplexer (DSLAM) that is connected to or part of the LPN. The wire center remote digital terminal provides standard analog telephone service between a plurality of standard telephone ports suitable for connection to local loop links of a plurality of customer sites and the PSTN switch through the host digital terminal. The wire center remote digital terminal comprises: a plurality of subscriber line interface circuits each suitable for connection to the local loop links of a plurality of customer sites via one of the plurality of standard telephone ports; a plurality of coder/decoders each for connection to a subscriber line interface circuit, each coder/decoder capable of converting analog telephone signals received from an associated subscriber line interface circuit to digital bit streams and converting a digital bit stream to analog telephone signals to be supplied to the associated subscriber line interface circuit; and a controller coupled to the coder/decoders and to the subscriber line interface circuits. The controller manages the interface of voice-band packets between the DSLAM and the plurality of standard telephone ports by: converting digital bit streams received from one or more coder/decoders to voice-band packets and coupling the voice-band packets to the LPN for transmission to the host digital terminal; and converting demodulated voice-band packets received by the DSLAM to digital bit streams and coupling the digital bit streams to an appropriate, one of the coder/decoders.

Another system according to the present invention communicates voice over a LPN to and from at least one customer site connected to the LPN via a local loop link, wherein the a remote digital terminal is not necessarily located at the customer site. This system comprises a host digital terminal at a control site within or connected to the LPN that interfaces voice calls between the LPN and a public switched telephone network (PSTN) switch via the LPN; and a wire center remote digital terminal that connects to or is incorporated in a digital subscriber line access multiplexer (DSLAM) that is connected to the LPN, the wire center remote digital terminal providing standard analog telephone service between a plurality of standard telephone ports suitable for connection to local loop links of a plurality of subscribers and the PSTN switch through the host digital terminal.

In this system, the wire center remote digital terminal comprises: a plurality of subscriber line interface circuits each suitable for connection to a telephone device via one of the plurality of standard telephone ports; a plurality of coder/decoders each for connection to a subscriber line interface circuit, each coder/decoder capable of converting analog telephone signals received from an associated subscriber line interface circuit to digital bit streams and converting a digital bit stream to analog telephone signals to be supplied to the associated subscriber line interface circuit; and a controller coupled to the coder/decoders and to the subscriber line interface circuits. The controller manages the interface of voice-band packets between the DSLAM and the plurality of standard telephone ports by: converting digital bit streams received from one or more coder/decoders to voice-band packets and coupling the voice-band packets to the LPN for transmission to the host digital terminal; and converting demodulated voice-band packets received by the DSLAM to digital bit streams and coupling the digital bit streams to an appropriate one of the coder/decoders.

The above description is intended by way of example only and is not intended to limit the present invention in any way except as set forth in the following claims.

What is claimed is:

1. A system for communicating voice over a local packet network (LPN) to and from a customer site connected to the LPN via a local loop link, comprising:
    a remote digital terminal at the customer site, the remote digital terminal interfacing a plurality of telephone devices at the customer site to the local loop link to transmit and receive voice via the LPN;
    a host digital terminal at a control site within or connected to the LPN that interfaces at least one voice call between the remote digital terminal and a public switched telephone network (PSTN) switch via the LPN; and
    a wire center remote digital terminal that connects to a digital subscriber line access multiplexer (DSLAM), the wire center remote digital terminal in communication with the LPN, the wire center remote digital terminal providing a standard analog telephone service between each of a plurality of standard telephone ports and the PSTN switch through the host digital terminal, where each of the plurality of standard telephone ports is suitable for connection to a subscriber loop link, where the subscriber loop link is communicatively coupled with a subscriber site.

2. The system of claim 1, wherein the wire center remote digital terminal comprises:
    a plurality of subscriber line interface circuits, each of the plurality of subscriber line interface circuits suitable for connection to the subscriber loop link via one of the plurality of standard telephone ports;
    a plurality of coder/decoders, each for connection to one of the plurality of subscriber line interface circuits, each of the plurality of coder/decoders capable of converting a first analog telephone signal received from the corresponding one of the plurality of subscriber line interface circuits to a first digital bit stream and converting a second digital bit stream to a second analog telephone signal to be supplied to one of the plurality of subscriber line interface circuits;
    a controller coupled to the plurality of coder/decoders and to the plurality of subscriber line interface circuits, the controller managing the interfacing of a first and a second plurality of voice-band packets between the DSLAM and the plurality of standard telephone ports by:
        converting the first digital bit stream received from one or more of the plurality of coders/decoders to a first plurality of voice-band packets and coupling the first plurality of voice-band packets to the LPN for transmission to the host digital terminal; and
        converting the second plurality of voice-band packets received by the DSLAM to the second digital bit stream and coupling the second digital bit stream to one of the plurality of coders/decoders.

3. The system of claim 1, and further comprising a splitter/combiner at the wire center having a first port coupled to the subscriber loop link, a second port coupled to the DSLAM, and a third port coupled to one of the plurality of standard telephone ports of the wire center remote digital terminal.

4. The system of claim 1, and further comprising a splitter/combiner at a subscriber site having a first port coupled to the subscriber loop link, a second port coupled to the remote digital terminal, and a third port suitable for connection to a telephone device.

5. The system of claim 1, and further comprising a splitter/combiner at a subscriber site having a first port coupled to the subscriber loop link, a second port coupled to a DSL modem, and a third port suitable for connection to a telephone device.

6. The system of claim 1, wherein the wire center remote digital terminal comprises:
    a plurality of subscriber line interface circuits, each of the plurality of subscriber line interface circuits suitable for connection to a telephone device;
    a plurality of coder/decoders, each for connection to one of the plurality of subscriber line interface circuits, each of the plurality of coder/decoders capable of converting a first analog telephone signal received from the corresponding one of the plurality of subscriber line interface circuits to a first digital bit stream and converting a second digital bit stream to a second analog telephone signal to be supplied to one of the plurality of subscriber line interface circuits; and
    a controller coupled to the plurality of coder/decoders and to the plurality of subscriber line interface circuits, the controller managing the interfacing of a first and a second plurality of voice-band packets between the DSLAM and the plurality of standard telephone ports by:
        converting the first digital bit stream received from one or more of the plurality of coders/decoders to a first plurality of voice-band packets and coupling the first plurality of voice-band packets to the LPN for transmission to the host digital terminal; and
        converting the second plurality of voice-band packets received by the DSLAM to the second digital bit stream and coupling the second digital bit stream to the corresponding one of the plurality of coders/decoders.

7. The system of claim 1, and further comprising a splitter/combiner at the wire center having a first port coupled to the subscriber loop link, a second port coupled to the DSLAM, and a third port coupled to one of the plurality of standard telephone ports of the wire center remote digital terminal.

8. The system of claim 1, and further comprising a splitter/combiner at a subscriber site having a first port coupled to the subscriber loop link, a second port coupled to the remote digital terminal, and a third port suitable for connection to a telephone device.

9. The system of claim 1, and further comprising a splitter/combiner at a subscriber site having a first port coupled to the subscriber loop link, a second port coupled to a modem at the customer site, and a third port suitable for connection to a telephone device.

10. The system of claim 1, where the host digital terminal is within the LPN.

11. The system of claim 1, where the host digital terminal is connected to the LPN.

12. A system for communicating voice over a local packet network (LPN) to and from at least one customer site connected to the LPN via a local loop link, comprising:
   a host digital terminal at a control site in communication with the LPN that interfaces a plurality of voice calls between the LPN and a public switched telephone network (PSTN) switch via the LPN; and
   a wire center remote digital terminal that connects to or is incorporated in a digital subscriber line access multiplexer (DSLAM) that is in communication with the LPN, the wire center remote digital terminal providing a standard analog telephone service between each of a plurality of standard telephone ports and the PSTN switch through the host digital terminal, where each of the plurality of standard telephone ports is suitable for connection to a subscriber loop link, where the subscriber loop link is communicatively coupled with a subscriber site.

13. A method for communicating voice and data to and from a customer site over a local packet network (LPN) supporting a packet-based transport protocol, the customer site comprising a plurality of telephone devices, the method comprising steps of at the customer site:
   converting a plurality of first analog telephone signals received from the plurality of telephone devices to a first plurality of voice-band packets and modulating the first plurality of voice-band packets for transmission over the LPN via a local loop link between the customer site and the LPN;
   demodulating a second plurality of voice-band packets received from the LPN on the local loop link;
   converting the second plurality of voice-band packets to a plurality of second analog telephone signals for connection to the corresponding one of the plurality of telephone devices; at a control site within or connected to the LPN:
      receiving the first plurality of voice-band packets from the customer site via the LPN;
      converting the first plurality of voice-band packets received from the customer site to a first timedivision multiplexed signal and coupling the first time-division multiplexed signal to a public switched telephone network (PSTN) switch; and
      converting a second time-division multiplexed signal received from the PSTN switch destined for the customer site to a second plurality of voice-band packets and coupling the second plurality of voice-band packets to the LPN for transmission to the customer site; at a wire center:
         providing a standard telephone port for connection to a subscriber loop link, where the subscriber loop link is communicatively coupled with a subscriber site, where the standard telephone port is capable of providing a standard analog service to the subscriber site;
         demodulating a third plurality of voice-band packets transmitted from the control site via the LPN and received at a subscriber line port of a multiplexer, the multiplexer located at the wire center;
         converting the third plurality of voice-band packets to a third analog telephone signal for connection to the subscriber loop link;
         converting a fourth analog telephone signal received on the subscriber loop link to a fourth plurality of voice-band packets and modulating the fourth plurality of voice-band packets; and
         coupling the fourth plurality of voice-band packets to the subscriber line port of the multiplexer for transmission over the LPN to the control site.

14. A method for communicating voice over a local packet network (LPN) to and from a customer site connected to the LPN via a local loop link, the customer site comprising a plurality of telephone devices, comprising steps of at a wire center:
   connecting to a subscriber line port of a multiplexer located at the wire center;
   providing a standard telephone port for connection to a subscriber loop link, where the subscriber loop link is communicatively coupled with a subscriber site, where the standard telephone port is capable of providing a standard analog telephone service to the subscriber site;
   demodulating a first plurality of voice-band packets received at a subscriber line port of a multiplexer located at the wire center;
   converting the first plurality of voice-band packets to a first analog telephone signal for connection to the subscriber loop link;
   converting a second analog telephone signal received on the subscriber loop link to a second plurality of voice-band packets and modulating the second plurality of voice-band packets; and
   coupling the second plurality of voice-band packets to the subscriber line port of the multiplexer for transmission over the LPN to a control site; at the control site within or connected to the LPN:
      receiving the second plurality of voice-band packets from the wire center via the LPN;
      converting the second plurality of voice-band packets received from the wire center to a first time-division multiplexed signal and coupling the first time-division multiplexed signal to a public switched telephone network (PSTN) switch; and
      converting a second time-division multiplexed signal received from the PSTN switch destined for the wire center to the first plurality of voice-band packets and coupling the first plurality of voice-band packets to the LPN for transmission to the wire center.

15. An apparatus configured to transport a voice signal between at least one subscriber site and a host digital terminal via a local packet network (LPN), comprising:
   an access network interface configured to communicate a plurality of voice packets to and from the host digital terminal via the LPN;
   at least one telephone port configured to communicate an analog voice signal to and from a subscriber loop, where the subscriber loop is communicatively coupled with the at least one subscriber site; and
   a converter configured to convert between the plurality of voice packets and the analog voice signal, where the remote digital terminal is communicatively coupled to the LPN by a local loop.

16. The apparatus of claim 15, where the local loop supports digital subscriber loop (DSL).

17. The apparatus of claim 15, where the remote digital terminal is located at a wire center.

18. The apparatus of claim 15, further comprising a DSL access multiplexer (DSLAM) communicatively coupled to the local loop and to the LPN.

19. The apparatus of claim 15, further comprising:
a subscriber line interface circuit (SLIC), the SLIC configured to communicate a first analog voice signal to a telephone device at the subscriber site, the SLIC further configured to communicate a second analog voice signal from the telephone device at the subscriber site;
a codec coupled to the SLIC, the codec configured to convert a first digital bit stream into the first analog voice signal, the codec further configured to convert the second analog voice signal into a second digital bit stream;
a controller coupled to the SLIC and to the codec, the controller configured to convert a first plurality of voice packets into the first digital bit stream, the controller further configured to convert the second digital bit stream into a second plurality of voice packets; and
a modem coupled to the controller and to the local loop link, the modem configured to modulate the first plurality of voice packets, the modem further configured to communicate the first plurality of voice packets to the LPN for transmission to the host digital terminal, the modem further configured to receive the second plurality of voice packets from the host digital terminal via the LPN, the modem further configured to demodulate the second plurality of voice packets.

20. The apparatus of claim 15, further comprising a plurality of telephone ports, each of the plurality of telephone ports configured to communicate one of a plurality of analog voice signals over a corresponding one of a plurality of subscriber loops, wherein the converter is further configured to convert between the plurality of voice packets and the plurality of analog voice signals, and wherein the remote digital terminal is communicatively coupled to each of a plurality of subscriber sites by one of the plurality of subscriber loops.

21. The apparatus of claim 20, further comprising:
a plurality of SLICs, each of the plurality of SLICs configured to communicate one of the plurality of first analog voice signals to a telephone device at the subscriber site, each of the plurality of SLICs further configured to communicate one of the plurality of second analog voice signals from the telephone device at the subscriber site; and
a plurality of codecs, each of the plurality of codecs coupled to a corresponding one of the plurality of SLICs, each of the plurality of codecs further configured to convert one of a plurality of first digital bit streams into one of the plurality of first analog voice signals, each of the plurality of codecs further configured to convert one of the plurality of second analog voice signals into a corresponding one of a plurality of second digital bit streams, wherein the controller is coupled to the plurality of SLICs and to the plurality of codecs, the controller configured to convert the first plurality of voice packets into a corresponding one of the first digital bit streams, the controller further configured to convert one of the plurality of second digital bit streams into the second plurality of voice packets.

22. A system to transport a voice signal between at least one subscriber site and a public switched telephone network (PSTN) over a local packet network (LPN) comprising:
a remote digital terminal, communicatively coupled to the LPN by a local loop and to the subscriber site by a subscriber loop; and
a host digital terminal, communicatively coupled to the PSTN and to the LPN, the remote digital terminal further comprising:

an access network interface configured to communicate a plurality of voice packets to and from the host digital terminal via the LPN;
at least one telephone port configured to communicate an analog voice signal to and from a subscriber loop, where the subscriber loop is communicatively coupled with the at least one subscriber site; and
a converter configured to convert between the plurality of voice packets and the analog voice signal; the host digital terminal further comprising:
a LPN interface coupled to the LPN, configured to communicate the plurality of voice-band packets to and from the remote digital terminal via the LPN;
a PSTN interface coupled to the PSTN, configured to communicate a voice signal to and from the PSTN; and
a packet converter coupled to the LPN interface and to the PSTN interface, the packet converter configured to convert the plurality of voice-band packets between a first format and a second format, where the first format is suitable for transport over the LPN and the second format is suitable for coupling to the PSTN.

23. The system of claim 22, where the host digital terminal is located in a central office.

24. The system of claim 22, where the first format is asynchronous transfer mode (ATM).

25. The system of claim 22, where the second format is time-division multiplex (TDM).

26. The system of claim 22, the remote digital terminal further comprising:
a subscriber line interface circuit (SLIC), the SLIC configured to communicate a first analog voice signal to a telephone device at the subscriber site, the SLIC further configured to communicate a second analog voice signal from the telephone device at the subscriber site;
a codec coupled to the SLIC, the codec configured to convert a first digital bit stream into the first analog voice signal, the codec further configured to convert the second analog voice signal into a second digital bit stream;
a controller coupled to the SLIC and to the codec, the controller configured to convert a first plurality of voice packets into the first digital bit stream, the controller further configured to convert the second digital bit stream into a second plurality of voice packets; and
a modem coupled to the controller and to the local loop link, the modem configured to modulate the first plurality of voice packets, the modem further configured to communicate the first plurality of voice packets to the LPN for transmission to the host digital terminal, the modem further configured to receive the second plurality of voice packets from the host digital terminal via the LPN, the modem further configured to demodulate the second plurality of voice packets.

27. The system of claim 22, the remote digital terminal further comprising a plurality of telephone ports, each of the plurality of telephone ports configured to communicate one of a plurality of analog voice signals over a corresponding one of a plurality of subscriber loops, wherein the converter is further configured to convert between the plurality of voice packets and the plurality of analog voice signals, and wherein the remote digital terminal is communicatively coupled to each of a plurality of subscriber sites by one of the plurality of subscriber loops.

28. The system of claim 27, the remote digital terminal further comprising:

a plurality of SLICs, each of the plurality of SLICs configured to communicate one of the plurality of first analog voice signals to a telephone device at the subscriber site, each of the plurality of SLICs further configured to communicate one of the plurality of second analog voice signals from the telephone device at the subscriber site; and a plurality of codecs, each of the plurality of codecs coupled to a corresponding one of the plurality of SLICs, each of the plurality of codecs further configured to convert one of a plurality of first digital bit streams into one of the plurality of first analog voice signals, each of the plurality of codecs further configured to convert one of the plurality of second analog voice signals into a corresponding one of a plurality of second digital bit streams, wherein the controller is coupled to the plurality of SLICs and to the plurality of codecs, the controller configured to convert the first plurality of voice packets into a corresponding one of the first digital bit streams, the controller further configured to convert one of the plurality of second digital bit streams into the second plurality of voice packets.

29. A system to transport a voice signal between at least one subscriber site and a public switched telephone network (PSTN) over a local packet network (LPN), and to transport a data signal between at least one subscriber site and a data network, comprising:

a remote digital terminal, communicatively coupled to the LPN by a local loop and to the subscriber site by a subscriber loop; and a host digital terminal, communicatively coupled to the PSTN and to the LPN; and an access multiplexer, communicatively coupled to the remote digital terminal, the remote digital terminal further comprising:

a network interface, configured to communicate a plurality of data packets between a local area network at the subscriber site and the data network via the LPN;

an access network interface configured to communicate a plurality of voice packets to and from the host digital terminal via the LPN;

at least one telephone port configured to communicate an analog voice signal to and from a subscriber loop, where the subscriber loop is communicatively coupled with the at least one subscriber site; and a converter configured to convert between the plurality of voice packets and the analog voice signal;

the host digital terminal further comprising:

a LPN interface coupled to the LPN, configured to communicate the plurality of voice-band packets to and from the remote digital terminal via the LPN;

a PSTN interface coupled to the PSTN, configured to communicate a voice signal to and from the PSTN; and a packet converter coupled to the LPN interface and to the PSTN interface, the packet converter configured to convert the plurality of voice-band packets between a first format and a second format, where the first format is suitable for transport over the LPN and the second format is suitable for coupling to the PSTN.

30. The system of claim 29, further comprising:

a first splitter, having a first port coupled to the local loop, a second port coupled to the access multiplexer, and a third port coupled to the at least one telephone port; and a second splitter, having a fourth port coupled to the local loop, a fifth port coupled to a telephone device, and a sixth port coupled to the remote digital terminal.

31. The system of claim 29, further comprising:

a first splitter, having a first port coupled to the local loop, a second port coupled to the access multiplexer, and a third port coupled to the at least one telephone port; and a second splitter, having a fourth port coupled to the local loop, a fifth port coupled to a telephone device, and a sixth port coupled to a digital subscriber loop (DSL) modem, the DSL modem located at the customer site.

32. The system of claim 29, the remote digital terminal further comprising:

a subscriber line interface circuit (SLIC), the SLIC configured to communicate a first analog voice signal to a telephone device at the subscriber site, the SLIC further configured to communicate a second analog voice signal from the telephone device at the subscriber site;

a codec coupled to the SLIC, the codec configured to convert a first digital bit stream into the first analog voice signal, the codec further configured to convert the second analog voice signal into a second digital bit stream;

a controller coupled to the SLIC and to the codec, the controller configured to convert a first plurality of voice packets into the first digital bit stream, the controller further configured to convert the second digital bit stream into a second plurality of voice packets; and a modem coupled to the controller and to the local loop link, the modem configured to modulate the first plurality of voice packets, the modem further configured to communicate the first plurality of voice packets to the LPN for transmission to the host digital terminal, the modem further configured to receive the second plurality of voice packets from the host digital terminal via the LPN, the modem further configured to demodulate the second plurality of voice packets.

33. The system of claim 29, the remote digital terminal further comprising:

a plurality of telephone ports, each of the plurality of telephone ports configured to communicate one of a plurality of analog voice signals over a corresponding one of a plurality of subscriber loops, wherein the converter is further configured to convert between the plurality of voice packets and the plurality of analog voice signals, and wherein the remote digital terminal is communicatively coupled to each of a plurality of subscriber sites by one of the plurality of subscriber loops.

34. The system of claim 29, the remote digital terminal further comprising:

a plurality of SLICs, each of the plurality of SLICs configured to communicate one of the plurality of first analog voice signals to a telephone device at the subscriber site, each of the plurality of SLICs further configured to communicate one of the plurality of second analog voice signals from the telephone device at the subscriber site; and a plurality of codecs, each of the plurality of codecs coupled to a corresponding one of the plurality of SLICs, each of the plurality of codecs further configured to convert one of a plurality of first digital bit streams into one of the plurality of first analog voice signals, each of the plurality of codecs further configured to convert one of the plurality of second analog voice signals into a corresponding one of a plurality of second digital bit streams, wherein the controller is coupled to the plurality of SLICs and to the plurality of codecs, the controller configured to convert the first plurality of voice packets into a corresponding one of the first digital bit streams, the controller further configured to convert one of the plurality of second digital bit streams into the second plurality of voice packets.

35. A method for communicating voice over a local packet network (LPN) to and from at least one subscriber site, comprising:

at a wire center:
  receiving at least one first analog telephone signal from at least one subscriber site over at least one subscriber loop;
  converting the at least first analog telephone signal to a first plurality of voice-band packets;
  communicating the first plurality of voice-band packets to the LPN for transmission to a control site;
  receiving a second plurality of voice-band packets from the control site via the LPN;
  converting the second plurality of voice-band packets to at least one second analog telephone signal; and
  communicating the at least one second analog telephone signal to the at least one subscriber site via the at least one subscriber loop;

at a control site:
  receiving the first plurality of voice-band packets from the wire center via the LPN;
  converting the first plurality of voice-band packets to a first TDM signal;
  communicating the first TDM signal to a PSTN switch;
  receiving a second TDM signal from the PSTN switch;
  converting the second TDM signal into the second plurality of voice-band packets; and
  communicating the second plurality of voice-band packets to the LPN for transmission to the wire center.

36. The method of claim 35 further comprising:
  modulating the first plurality of voice-band packets; and
  demodulating the second plurality of voice-band packets.

37. The method of claim 35 where communicatively coupling the first plurality of voice-band packets to the LPN further comprises communicating the first plurality of voice-band packets to a subscriber line port of an access multiplexer, where the access multiplexer is in communication with the LPN.

38. A method for transporting voice signals over a local packet network (LPN) to and from a subscriber site, the subscriber site comprising a plurality of first telephone devices and a second telephone device, the method comprising:

at a customer site:
  receiving a first plurality of analog telephone signals from the plurality of first telephone devices over a subscriber loop;
  converting the first plurality of analog telephone signals to a first plurality of voice-band packets;
  coupling the first plurality of voice-band packets to the LPN for transmission to a control site;
  receiving a second plurality of voice-band packets from the control site via the LPN;
  converting the second plurality of voice-band packets to a second plurality of analog telephone signals; and
  communicating the second plurality of analog telephone signals to the plurality of first telephone devices via the subscriber loop;

at a wire center:
  receiving a first analog telephone signal from the second telephone device over the subscriber loop;
  converting the first analog telephone signal to a third plurality of voice-band packets;
  communicating the third plurality of voice-band packets to the LPN for transmission to the control site;
  receiving a fourth plurality of voice-band packets from the control site via the LPN;
  converting the fourth plurality of voice-band packets to a second analog telephone signal; and
  communicating the second analog telephone signal to the second telephone device via the subscriber loop;

at a control site:
  receiving the first plurality of voice-band packets from the customer site via the LPN;
  receiving the third plurality of voice-band packets from the wire center via the LPN;
  converting the first plurality of voice-band packets to a first TDM signal;
  converting the third plurality of voice-band packets to a second TDM signal;
  communicating the first TDM signal and the second TDM signal to a PSTN switch;
  receiving a third TDM signal and a fourth TDM signal from a PSTN switch;
  converting the third TDM signal into the second plurality of voice-band packets;
  converting the fourth TDM signal into the fourth plurality of voice-band packets;
  communicating the second plurality of voice-band packets to the LPN for transmission to the customer site; and
  communicating the fourth plurality of voice-band packets to the LPN for transmission to the wire center.

* * * * *

UNITED STATES PATENT AND TRADEMARK OFFICE
CERTIFICATE OF CORRECTION

PATENT NO. : 6,639,913 B1  
DATED : October 28, 2003  
INVENTOR(S) : David P. Frankel, Joe Boucher and Kenneth M. Kolderup It is certified that error appears in the above-identified patent and that said Letters Patent is hereby corrected as shown below:

Column 2,
Line 66, delete the comma "," between the words "the" and "L.P.N. --

Column 7,
Line 26, delete "lo" between the words "is" and "the".

Column 10,
Line 62, delete the period "." between the words "each" and "call".

Column 14,
Line 66, delete the period "." between the words "a" and "data".

Signed and Sealed this

Twenty-third Day of March, 2004

JON W. DUDAS
*Acting Director of the United States Patent and Trademark Office*